H. STROHBACH.
COFFEE URN.
APPLICATION FILED SEPT. 30, 1919.
1,349,236.
Patented Aug. 10, 1920.
2 SHEETS—SHEET 1.
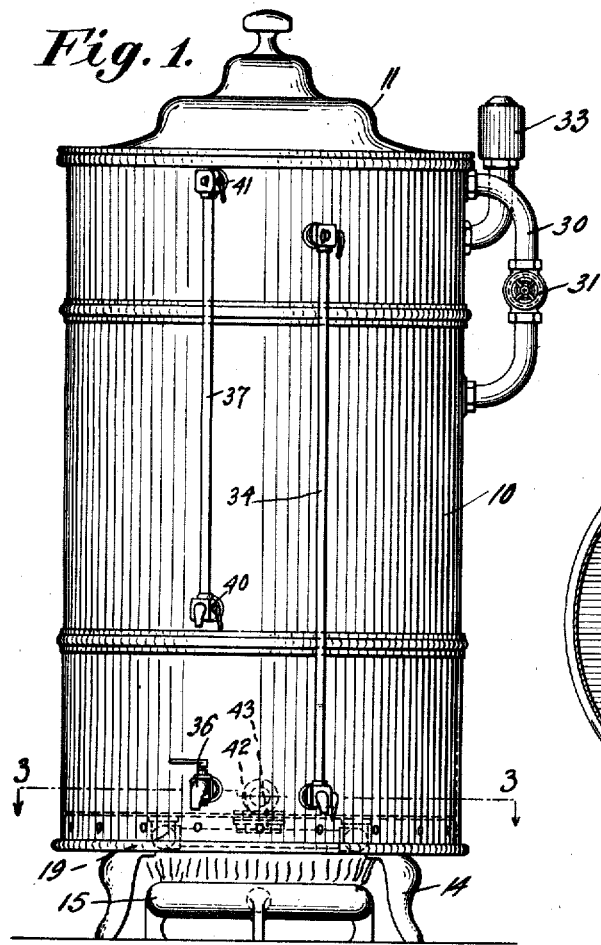
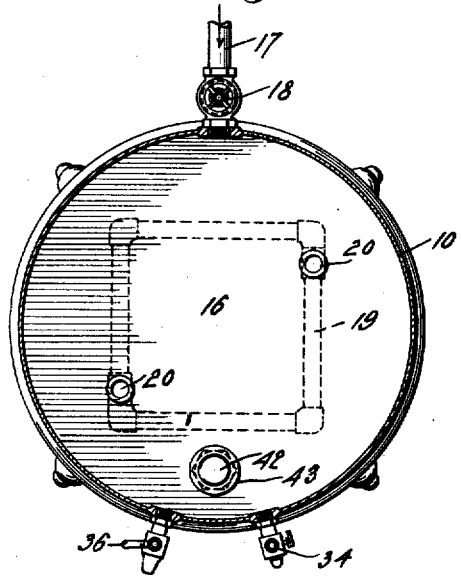
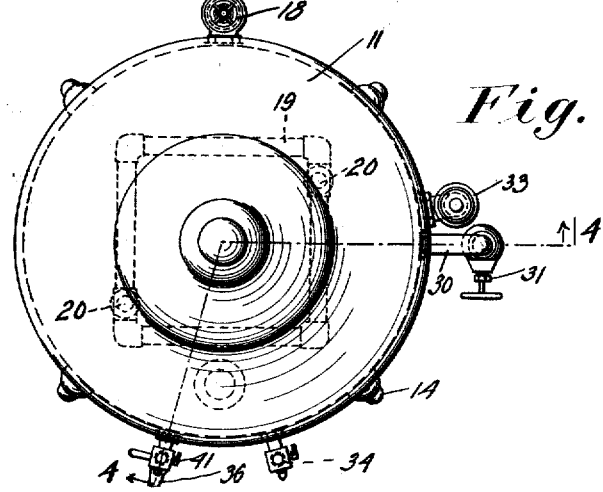
INVENTOR
H. Strohbach
BY
Sigmund Herzog
ATTORNEY

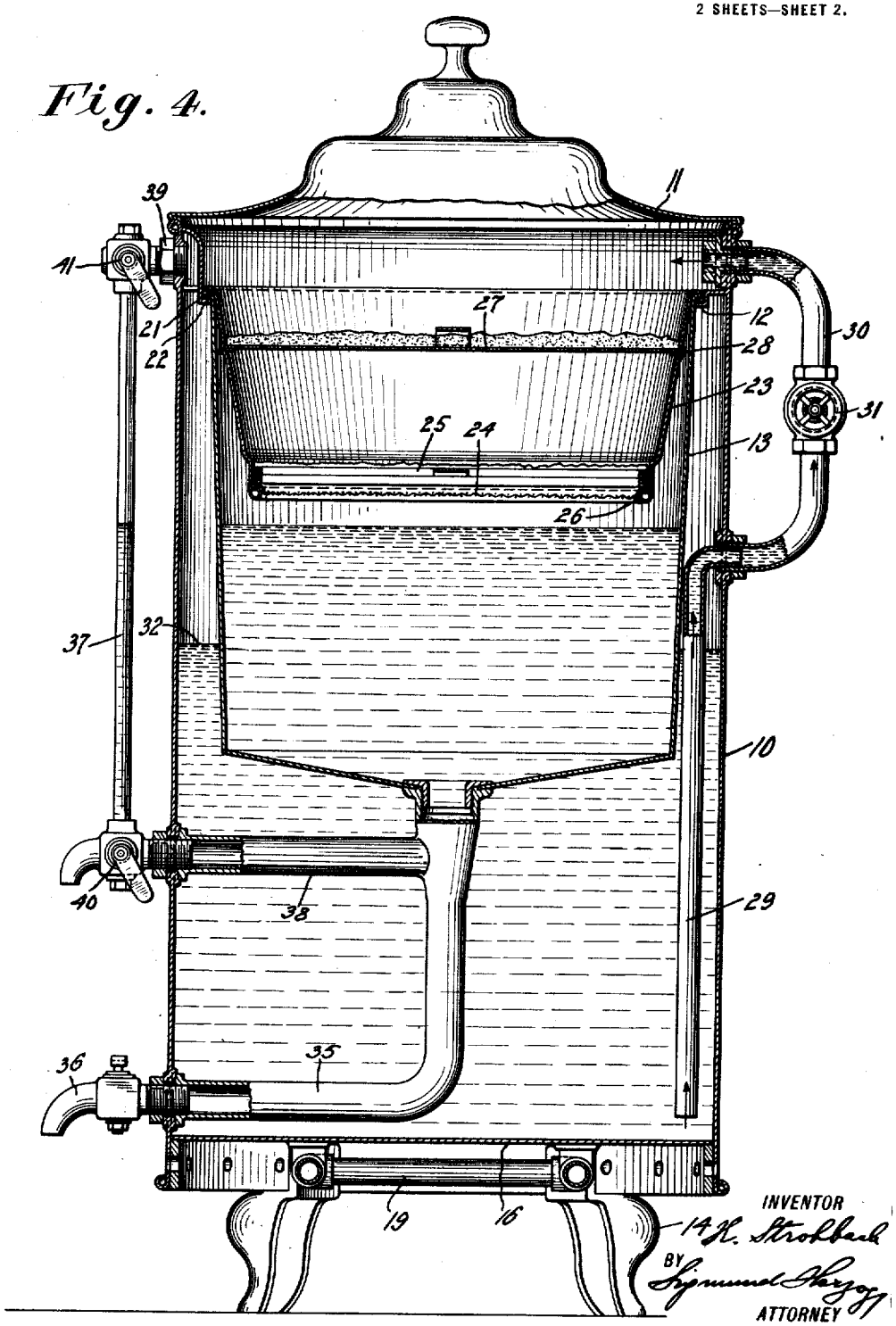

UNITED STATES PATENT OFFICE.

HENRY STROHBACH, OF NEW YORK, N. Y.

COFFEE-URN.

1,349,236.  Specification of Letters Patent.  Patented Aug. 10, 1920.

Application filed September 30, 1919. Serial No. 327,536.

*To all whom it may concern:*

Be it known that I, HENRY STROHBACH, a citizen of the United States, and a resident of New York, in the county of Kings and State of New York, have invented certain new and useful Improvements in Coffee-Urns, of which the following is a specification.

The present invention relates to improvements in coffee urns and the like, and particularly to that class which is used in hotels, restaurants, and generally in places where coffee is made in large quantities.

One of the objects of the invention is to provide an urn, having means whereby the too strong extract, settling on the bottom of the liquid-holding receptacle, may be conveniently mingled with the coffee, thereby producing an even mass.

Another object of the invention is to provide a coffee urn, having an effective water heating means, which quickly and conveniently produces steam for forcing the hot water up to the top of the ground coffee holding vessel, where it percolates through the coffee.

A further object of the invention is to produce a construction for holding the coffee or the like, while it is being steeped, which is readily removable from the urn and is of such character that it may be conveniently cleaned and used a number of times.

A still further object of the invention is to generally improve the construction of urns and adapt them for manufacture on a commercial scale, that is to say, to make them so simple in construction that they are capable of being produced at a cost not exceeding that of similar contrivances heretofore in use.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a front elevation of a coffee urn constructed in accordance with the present invention; Fig. 2 is a top plan view of the same; Fig. 3 is a section taken on line 3—3 of Fig. 1; and Fig. 4 is a section taken on line 4—4 of Fig. 2, on a larger scale.

In the drawings, the numeral 10 indicates an upright boiler, as usual in constructions of this type, said boiler being made of any suitable material adapted to hold water and being, preferably, cylindrical in configuration. The boiler is covered by an ordinary lid 11, which is removable but forms a substantial air- and water-tight closure. Adjacent the upper end of the boiler there is formed within the same a flange 12, supporting an extract-holding receptacle 13, that is spaced from the boiler and is of a height substantially one-half of that of said boiler. The boiler is supported in any suitable manner, for instance on legs 14, between which is disposed a heater 15, preferably a gas heater, the flame rising therefrom striking the bottom 16 of the boiler. Water is led into the boiler though a pipe 17, communicating with the boiler adjacent its bottom, a valve or faucet 18 being inserted into said pipe for obvious reasons. Below the bottom of the boiler is disposed a pre-heater 19, in the form of an endless pipe, which communicates through at least two openings 20 with the interior of the boiler.

The top edge of the extract-holding receptacle 13 is made in the form of a ring 21, on which rests the outwardly turned flange 22 of a preferably conical vessel 23, the latter holding the ground coffee or the like. The bottom 24 of this vessel is made of some textile fabric, such as cheese cloth, forming a strainer, that is held in position by a clamping ring 25, resting on an inwardly turned flange 26 on the lower edge of the vessel 23. A perforated disk 27, seated in a groove 28, in the vessel 23, serves to prevent the ground coffee from rising in the vessel 23 during the percolating process. This disk is disposed a suitable distance above the strainer bottom 24 and is removable, so as to permit of emptying of said vessel and also of removing the bottom thereof, when it is intended to clean the latter or to replace the same.

A pipe 29 leads from a point adjacent the bottom of the boiler up to the open top of the vessel 23, the major portion of said pipe being disposed within the boiler and a short section thereof, denoted by the numeral 30, being located outside of the boiler. In this short section is inserted a valve 31. Above the normal water level, denoted in the drawings by the numeral 32, there communicates with the boiler a safety valve 33, for automatically preventing the steam pressure in the boiler from rising above a predetermined point. As usual in the construction of these urns, there is provided a water gage 34, connected at its lower end with the boiler adjacent the bottom of the latter, its upper end being tapped into the boiler a substantial distance above the normal water level therein.

The extract-holding receptacle 13 is provided with a delivery pipe 35, that extends through the boiler a short distance above its bottom and is provided at its outer extremity with a draw-off faucet 36. In order to indicate the height of the extract within the receptacle 13, there is provided a gage 37, the lower extremity of which is connected by a pipe 38 with the delivery pipe 35. The upper extremity of the gage 37 is connected to a coupling 39, that leads to the steam space of the boiler. Faucets 40 and 41 at the upper and lower ends of the gage 37 control the passage of fluid therethrough.

For the purpose of emptying the boiler, there is an outlet opening 42 provided in the bottom thereof, said opening being closed by a cover 43 of any suitable construction.

The operation of this device is as follows:—Water is admitted into the boiler through the pipe 17, the valve 18 being turned to closing position when the proper level has been reached. Ground coffee, or like material, is placed into the vessel 23, the disk 27 being forced into place. The burner is then put into operation, its flame striking the pre-heater 19 and the bottom of the boiler, thereby bringing, in time, the water to boiling point. The pre-heater is continuously and automatically filled and emptied, the boiling water in the pre-heater squirting out through the openings 20, and water of lower temperature flowing into said pre-heater. When the water is at boiling point, the valve 31 is opened, and, as soon as there is enough steam pressure in the boiler, water is forced up through the pipe 29 into the space above the vessel 23, flowing through the same and extracting the essence from the coffee or other material. The extract collects in the receptacle 13. It is to be observed that the uppermost portion of the pipe 29 is disposed substantially horizontally. Due to this arrangement, the boiling water spreads out over the surface of the vessel 23, it being distributed substantially even over the top surface of the coffee or other material therein. The extract is allowed to rise to a level below that of the vessel 23.

As the extract is allowed to stand, it happens sometimes that it is stronger at the bottom of the receptacle than at the upper levels. In order to obtain an extract that is even throughout, the mass must be stirred up. This may be accomplished by opening the faucet 41 and permitting steam to pass through the gage 37 and pipe 38 into the receptacle 13.

The level of the extract in the receptacle 13 can always be ascertained by looking at the gage 37.

It is to be observed that, since the delivery pipe 35 is wholly disposed within the boiling or hot water in the boiler, the coffee extract therein is always maintained at the temperature of the water in the boiler.

As above mentioned, the endless pipe 19 communicates through at least two openings with the boiler. The purpose of this arrangement is to produce a noiseless urn, the water jets issuing from the said pipe being silenced by the arrangement described, which would not be the case if only a single opening were provided.

What I claim is:—

1. In an urn, the combination with a boiler, of an extract-holding receptacle therein, a coffee-holding vessel extending into said receptacle, a pipe leading from a point adjacent the bottom of said boiler above said vessel, a delivery pipe leading from the bottom of said receptacle, and a gage connected at its lower end with said delivery pipe and at its upper end with the steam space of the boiler.

2. In an urn, the combination with a boiler, of an extract-holding receptacle therein, a delivery pipe leading from the bottom of said receptacle, and a cock-controlled pipe connected at its lower end with said delivery pipe and at its upper end with the steam space of the boiler.

Signed at New York, in the county of New York and State of New York, this 8th day of Sep., A. D. 1919.

HENRY STROHBACH.